(No Model.)

J. A. CHAPMAN.
TWO WHEELED VEHICLE.

No. 280,795. Patented July 10, 1883.

Witnesses:
Chas. W. Goss.
Frank Regensdorf.

John A. Chapman,
Inventor.
per E. H. Bottum
Attorney

UNITED STATES PATENT OFFICE.

JOHN A. CHAPMAN, OF MILWAUKEE, WISCONSIN, ASSIGNOR TO THE NORTH-WESTERN SLEIGH COMPANY, OF SAME PLACE.

TWO-WHEELED VEHICLE.

SPECIFICATION forming part of Letters Patent No. 280,795, dated July 10, 1883.

Application filed January 31, 1883. (No model.)

*To all whom it may concern:*

Be it known that I, JOHN A. CHAPMAN, of Milwaukee, in the county of Milwaukee and State of Wisconsin, have invented certain new and useful Improvements in Two-Wheeled Vehicles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to two-wheeled vehicles; and it consists of a novel device for adjustably attaching the shafts to the body of the cart, and of a peculiar method of constructing and hanging the body, so that a person can easily mount the cart in front of the wheels.

The objects of my invention are, first, to produce a light, easy-riding, and graceful cart; second, an easy way of adjusting the inclination of the body for horses of different heights; and, third, a cart which may be mounted in front of the wheels without climbing over the shafts or seat-supports.

In the accompanying drawings like letters refer to the same parts in each figure.

Figure 1:
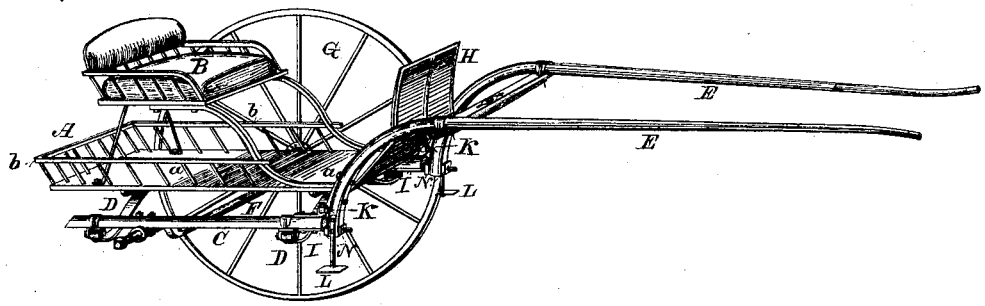
Figure 2:
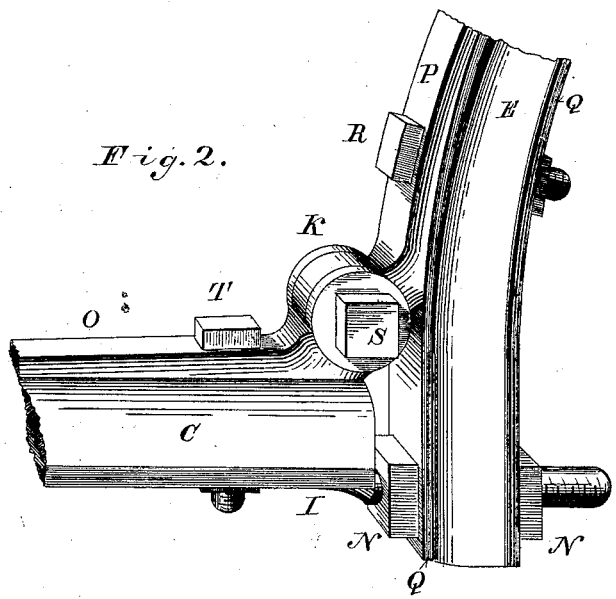

Figure 1 is a perspective view of my improved cart with the front wheel removed; and Fig. 2 is a like view of the adjustable joint connecting the shafts with the body, drawn on a greatly enlarged scale.

A is the body, consisting of the platform *a a*, dash H, and seat B. *b b* is a small rail raised upon a row of small spindles about the edges of the platform *a*, and attached at its ends to the front supporting-braces of seat B. The body A is mounted upon two half-elliptic springs, D D, one in front of and one in the rear of axle F, and both parallel thereto, and attached at their ends to the bed-pieces C C, which rest upon the axle F, and are secured thereto at right angles, just inside of the wheels G.

E E are the shafts, provided with a cross-bar and whiffletree, as usual, and curved downward at their rear ends, and adjustably attached to the front ends of the bed-pieces C C by the hinge-joints K K, and firmly held at any desired angle thereto by the threaded bolts I I, which are secured to the under side of the front ends of the bed-pieces C C, pass through holes in the ends of the shafts, and are provided with nuts N N on each side thereof. The joint K is composed of the two iron straps O and P, formed into eyes which interlock and receive the bolt S, which keeps them together. The strap O is attached to the top of the bed-piece C by bolts T, and the strap P is attached to the upper side of the shaft E by bolts R. The ends of the shafts E E extend a little below the bed-pieces C C, and are perforated to receive the bolts I I, which are provided with the nuts N N on each side of the shafts, to hold the same in place.

Q Q are iron straps bolted to the front and rear sides of the curved portions of the shafts, to strengthen the same and to prevent the nuts N N from breaking or marring the wood. The perforations in the ends of the shafts E E and the straps Q Q to receive the threaded bolts I I are made a little larger than said bolts, or they may be slotted or cut entirely through below to permit of the required adjustment of the shafts upon their pivots K K with reference to bed-pieces C C, which sustain the body A. By turning both nuts N N in either direction the shafts will swing upon their pivots K K, and may thereby be secured at any desired angle to the bed-pieces C C or body A, according to the size of the horse to be used.

By curving the shafts E E as herein described, and by mounting the body upon the horizontal bed-pieces C C, an open space is left in front of the wheels, rendering it easy to mount the cart at that point, instead of, in the usual way, from the rear, between the wheels and seat, in which case the seat is necessarily made quite short, whereas in my improved cart the seat may be made of the length commonly employed in buggies and carriages.

L L are steps to assist in mounting the vehicle at the front.

Having thus described my invention, I claim—

1. In a cart or sulky, the combination of the bed-pieces C C, shafts E E, downwardly curved at their rear ends, and provided with the hinge-joint K, bolts I I, and nuts N N, substantially as and for the purposes set forth.

2. In a cart or sulky, the hinge-joint K, composed of eyed straps O and P and bolt S, in combination with bed-pieces C C, provided with bolts I I and check-nuts N N, together with shafts E E, substantially as and for the purposes set forth.

3. The combination, in a cart or sulky, of the shafts E E, pivoted by joints K K to bed-pieces C C, bed-pieces C C, provided with threaded bolts I I and nuts N N, whereby said shafts may be adjusted with reference to said bed-pieces, springs D D, and body A, substantially as and for the purposes set forth.

4. The combination, in a cart or sulky, of the shafts E E, curved downward at the rear and pivoted to bed-pieces C C, bed-pieces C C, provided with bolts I I and nuts N N, whereby the inclination of said shafts to said bed-pieces may be adjusted, axle F, to which bed-pieces C C are directly attached, springs D D, and spindle-body A, substantially as and for the purposes set forth.

In testimony that I claim the foregoing as my own I affix my signature in presence of two witnesses.

JOHN A. CHAPMAN.

Witnesses:
   CHAS. L. GOSS,
   CHAS. H. PALMER.